(12) United States Patent
Murakami et al.

(10) Patent No.: US 10,273,829 B2
(45) Date of Patent: Apr. 30, 2019

(54) CYLINDRICAL CASE AND MANUFACTURING METHOD OF CYLINDRICAL CASE

(71) Applicants: IHI Corporation, Tokyo (JP); IHI AEROSPACE CO., LTD., Tokyo (JP)

(72) Inventors: Tsutomu Murakami, Tokyo (JP); Ikuo Okumura, Tokyo (JP); Yuu Shigenari, Tokyo (JP); Takashi Harada, Tokyo (JP); Yusuke Dan, Tokyo (JP)

(73) Assignees: IHI Corporation, Tokyo (JP); IHI Aerospace Co., Ltd., Tokyo (JP)

( * ) Notice: Subject to any disclaimer, the term of this patent is extended or adjusted under 35 U.S.C. 154(b) by 1041 days.

(21) Appl. No.: 14/695,821

(22) Filed: Apr. 24, 2015

(65) Prior Publication Data

US 2015/0226088 A1 Aug. 13, 2015

Related U.S. Application Data

(63) Continuation of application No. PCT/JP2013/078585, filed on Oct. 22, 2013.

(30) Foreign Application Priority Data

Oct. 25, 2012 (JP) .................................. 2012-235354

(51) Int. Cl.
*F01D 9/00* (2006.01)
*F01D 25/24* (2006.01)
(Continued)

(52) U.S. Cl.
CPC .......... *F01D 25/243* (2013.01); *B29C 70/222* (2013.01); *B29C 70/446* (2013.01);
(Continued)

(58) Field of Classification Search
CPC ...... F01D 25/243; F01D 25/246; F01D 25/24; F01D 25/265; F01D 25/28; F01D 25/285
(Continued)

(56) References Cited

U.S. PATENT DOCUMENTS 4,256,790 A * 3/1981 Lackman .............. B29C 66/112
428/73
4,331,723 A * 5/1982 Hamm .................. B29C 70/865
428/61

(Continued)

FOREIGN PATENT DOCUMENTS

EP 1927731 A2 6/2008
JP 2005-97759 A 4/2005
(Continued)

OTHER PUBLICATIONS

Extended European Search Report, European Patent Application No. 13848822.6, dated May 25, 2016, 5 pgs.
(Continued)

*Primary Examiner* — Justin Seabe
*Assistant Examiner* — Jason Mikus
(74) *Attorney, Agent, or Firm* — Volpe and Koenig, P.C.

(57) ABSTRACT

A cylindrical case includes a case main body made of a composite material of reinforcing fibers impregnated with a thermosetting resin, and an outward flange on the case main body. The outward flange includes: a bonding layer; a foundation layer disposed on the bonding layer; one flange constituting layer having a leg layer which is laminated from one slope surface of the foundation layer to the bonding layer and a wall layer which rises from the one slope surface; and the other flange constituting layer having a leg layer which is laminated from the other slope surface of the foundation layer to the bonding layer and a wall layer which rises from the other slope surface. The foundation layer is (Continued)

formed by laminating roving layers, while the flange constituting layers are formed by laminating a plurality of biaxial fabric layers including a biaxial fabric of a non-crimp structure.

8 Claims, 6 Drawing Sheets

(51) Int. Cl.
  *F02K 3/06*   (2006.01)
  *F01D 21/04*   (2006.01)
  *B29C 70/44*   (2006.01)
  *B29C 70/22*   (2006.01)
  *B32B 37/10*   (2006.01)
  *B32B 37/18*   (2006.01)
  *B32B 38/00*   (2006.01)
  *B32B 38/08*   (2006.01)
  *F01D 25/00*   (2006.01)
  *B29L 31/00*   (2006.01)

(52) U.S. Cl.
  CPC .............. *B32B 37/10* (2013.01); *B32B 37/18* (2013.01); *B32B 38/0012* (2013.01); *B32B 38/08* (2013.01); *F01D 21/045* (2013.01); *F01D 25/005* (2013.01); *F01D 25/24* (2013.01); *F02K 3/06* (2013.01); *B29L 2031/7504* (2013.01); *B32B 2305/08* (2013.01); *B32B 2305/18* (2013.01); *F05D 2220/40* (2013.01); *F05D 2300/44* (2013.01); *F05D 2300/603* (2013.01); *F05D 2300/611* (2013.01); *F05D 2300/614* (2013.01); *Y02T 50/672* (2013.01); *Y10T 156/1051* (2015.01)

(58) Field of Classification Search
  USPC .......................................................... 415/200
  See application file for complete search history.

(56) References Cited

U.S. PATENT DOCUMENTS

| | | | | |
|---|---|---|---|---|
| 4,492,607 | A | * | 1/1985 | Halcomb .............. B29C 70/083 156/242 |
| 8,540,833 | B2 | * | 9/2013 | Deobald ............... B29C 70/865 156/180 |
| 9,151,166 | B2 | * | 10/2015 | Uskert .................... F01D 5/225 |

FOREIGN PATENT DOCUMENTS

| | | |
|---|---|---|
| JP | 2006-069166 A | 3/2006 |
| JP | 2006-177364 A | 7/2006 |
| JP | 2008-144757 A | 6/2008 |
| JP | 2009-107337 A | 5/2009 |
| JP | 2011-2069 A | 1/2011 |
| JP | 2011-98524 A | 5/2011 |
| WO | 2009/036736 A1 | 3/2009 |

OTHER PUBLICATIONS

International Search Report, PCT/JP2013/078585, dated Nov. 19, 2013, 2 pgs.

* cited by examiner

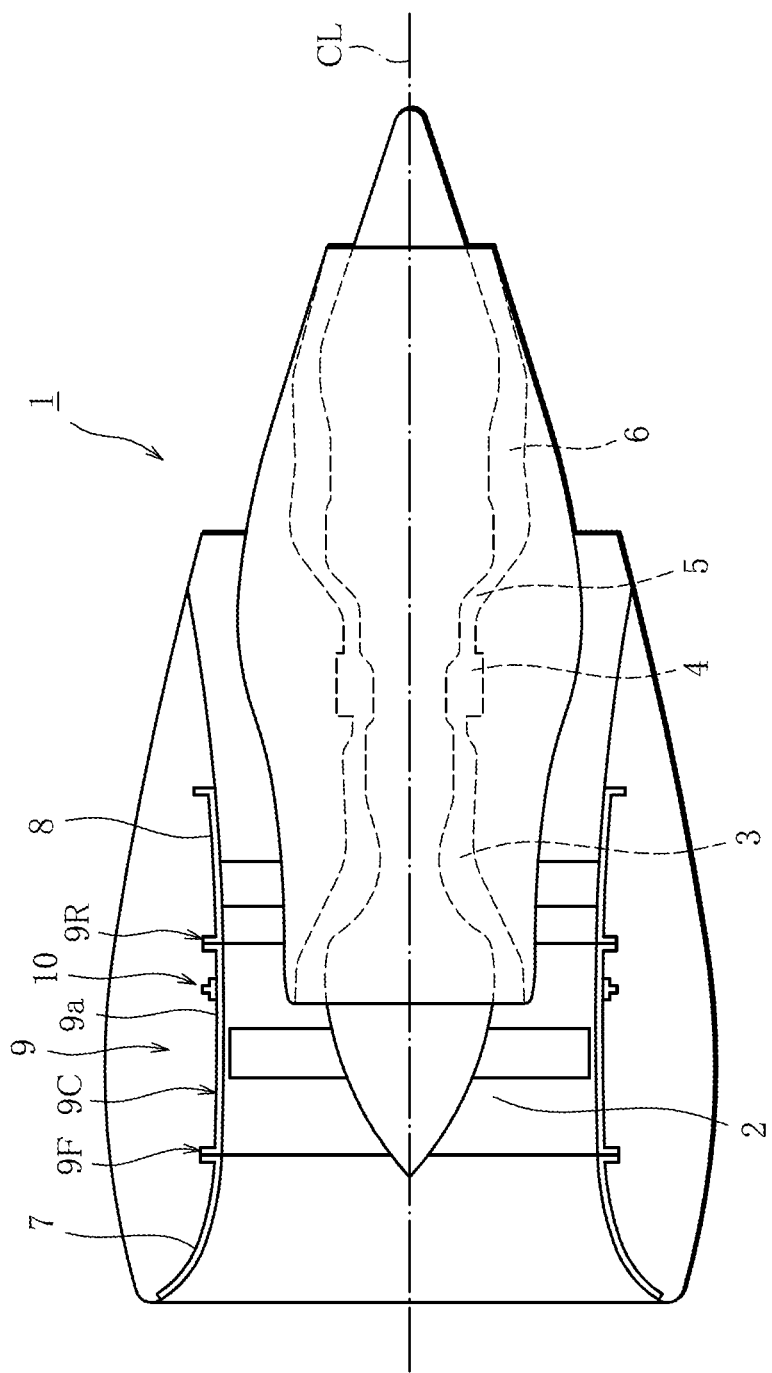

DIRECTION
OF AXIS CL
FRONT ⟵⟶ REAR

CYLINDRICAL CASE AND MANUFACTURING METHOD OF CYLINDRICAL CASE

TECHNICAL FIELD

The present invention relates to a cylindrical case which is used, for example, as a fan case for covering the fan blades of an aircraft jet engine, and to a manufacturing method of the cylindrical case.

BACKGROUND ART

The above fan case for covering the fan blades of an aircraft jet engine is required to be lightweight and have high strength, and in order to meet these requirements, there are attempts of adopting a composite material consisting of reinforcing fibers and a thermosetting resin as the raw material of the fan case.

In the above fan case, an outward flange, on which, for example, a structure such as a gear box is mounted, or depending on the design, which can be part of a structure for coupling the jet engine with a wing or a structure for transmitting the jet engine thrust to the airframe, is disposed annularly along a circumferential direction in an intermediate part of a case main body which covers the fan blades and forms a cylindrical shape. A composite material consisting of reinforcing fibers such as carbon fibers and a thermosetting resin such as an epoxy resin is beginning to be adopted as the raw material of this outward flange as with the case main body.

Examples of the outward flange for which this composite material is beginning to be adopted include the one described in Patent Document 1. This outward flange includes a flange main body layer which forms an annular flange main body part extending along the circumferential direction of the case main body, and an adherent support layer which fixes the flange main body layer on the outer peripheral surface of the case main body while supporting the flange main body layer from both sides. Both the flange main body layer and the adherent support layer are formed by laminating a plurality of fabric layers including a fabric composed of reinforcing fibers such as carbon fibers.

In the manufacture of a fan case (cylindrical case) by forming the above-described outward flange on the outer peripheral surface of the case main body, first, a laminate is molded by laying a plurality of fabric layers on top of one another, and the thermosetting resin, with which the fabric layers are pre-impregnated, is cured by heating this laminate to form the flange main body layer.

Next, the flange main body layer is disposed along the circumferential direction on the outer peripheral surface of the case main body which is made of a composite material consisting of reinforcing fibers and a thermosetting resin, and after a plurality of fabric layers are laminated on both sides of this flange main body layer and molded as the adherent support layer, the flange main body layer is fixed on the outer peripheral surface of the case main body by heating the adherent support layer and curing the thermosetting resin in the same manner as with the flange main body layer.

PRIOR ART DOCUMENT

Patent Document

Patent Document 1: Japanese Patent Laid-Open No. 2008-144757

SUMMARY OF THE INVENTION

Problems to be Solved by the Invention

With the above-described fan case, however, in the formation of the outward flange on the outer peripheral surface of the case main body, since the adherent support layer is molded on both sides of the flange main body layer while the flange main body layer is disposed on the outer peripheral surface of the case main body along the circumferential direction, a clearance may be left between the base end part of the flange main body layer and the adherent support layer covering this base end part, and solving this problem is a hitherto existing challenge.

The present invention has been devised, with a focus on the above existing challenge, and an object of the present invention is to provide a cylindrical case with which it is possible to secure high structural strength in the part of the outward flange in the case where the cylindrical case is made of a composite material consisting of, for example, reinforcing fibers and a thermosetting resin as the raw material and is a fan case having an annular outward flange, and to provide a manufacturing method of the cylindrical case.

Means for Solving the Problems

In order to achieve the above object, the present invention provides a cylindrical case made of a composite material of reinforcing fibers impregnated with a thermosetting resin, the cylindrical case including:
a case main body which forms a cylindrical shape; and
an outward flange which is disposed on an outer peripheral surface of the case main body annularly along a circumferential direction, wherein
the outward flange includes:
a bonding layer bonded on the outer peripheral surface of the case main body;
a foundation layer having a triangular shape in cross-section and disposed on the bonding layer in the circumferential direction of the case main body;
one flange constituting layer integrally having a leg layer which is laminated from one slope surface of the foundation layer to the bonding layer on the side of the one slope surface, and a wall layer which rises from the one slope surface of the foundation layer in a distal direction; and
the other flange constituting layer integrally having a leg layer which continues to the bonding layer and is laminated from the other slope surface of the foundation layer to the bonding layer on the side of the other slope surface, and a wall layer which rises from the other slope surface of the foundation layer in the distal direction and overlaps with the wall layer of the one flange constituting layer,
the foundation layer is formed by laminating roving layers including a roving composed of a bundle of reinforcing fibers, and
the one flange constituting layer integrally having the leg layer and the wall layer and the other flange constituting layer integrally having the bonding layer, the leg layer, and the wall layer are both formed by laminating a plurality of biaxial fabric layers including a biaxial fabric of a non-crimp structure composed of two axes of reinforcing fiber bands having an orientation angle of ±15-75° to an axial direction of the case main body.

It is preferable that the outer peripheral surface of the case main body and each of the wall layers of both flange constituting layers in the outward flange are all coated with a protective layer made of a composite material of reinforcing fibers impregnated with a thermosetting resin.

It is preferable that the cylindrical case is used as a fan case for covering the fan blades of an aircraft jet engine.

The present invention further provides a manufacturing method of the above-described cylindrical case, including:

forming the outward flange by going through the following steps:

laminating a bonding layer part of the other flange constituting layer having a sheet-like shape on a die to form the bonding layer;

forming the foundation layer having a triangular shape in cross-section on the bonding layer in the other flange constituting layer having a sheet-like shape which is laminated on the die;

laminating a leg layer part of the one flange constituting layer having a sheet-like shape from the one slope surface of the foundation layer to the bonding layer located on the side of the one slope surface in the other flange constituting layer to form the leg layer;

raising a wall layer part of the one flange constituting layer on the one slope surface of the foundation layer to form the wall layer;

folding the part of the other flange constituting layer which continues to the bonding layer on the side of the other slope surface of the foundation layer and laving this folded part from the bonding layer over the other slope surface of the foundation layer to form the leg layer of the other flange constituting layer, and raising the folded part on the other slope surface of the foundation layer to form the wall layer so as to overlap with the wall layer of the one flange constituting layer; and placing a pressure receiving die on the side of the other flange constituting layer and heating and pressurizing the laminate in a bagged state to cure the thermosetting resin with which each of the reinforcing fibers of the fabric layers are impregnated, and thereafter bonding the outward flange, which is released from the die, onto the outer peripheral surface of the cylindrical case main body which is made of a composite material of reinforcing fibers impregnated with a thermosetting resin.

In the cylindrical case and the manufacturing method of the cylindrical case according to the present invention, for example, carbon fibers, glass fibers, organic fibers (aramid, PBO, polyester, polyethylene), alumina fibers, and silicon carbide fibers can be used as the reinforcing fibers of the composite material of the case main body and the outward flange, and for the thermosetting resin as a matrix, for example, polyester resin, epoxy resin, vinyl ester resin, phenol resin, bismaleimide resin, oxazoline resin, and melamine resin can be used.

In the cylindrical case according to the present invention, since both the one flange constituting layer and the other flange constituting layer of the outward flange are formed by laminating the plurality of biaxial fabric layers including a biaxial fabric of a non-crimp structure made of a bundle of reinforcing fibers such as carbon fibers, as the stretchability which is characteristic of the non-crimp structure is exerted, during the manufacture of the outward flange, the flange constituting layers are folded without developing wrinkling or fiber meandering.

In the cylindrical case according to the present invention, each of the leg layers of both flange constituting layers, the one flange constituting layer and the other flange constituting layer, are laminated on both slope surfaces of the foundation layer laminated on the bonding layer and the bonding layer, and each of the wall layers of both flange constituting layers are raised on both slope surfaces of the foundation layer in the manufacture of the outward flange. Thus, the possibility of a clearance being left between both flange constituting layers and the foundation layer is almost eliminated, so that high structural strength is secured in the part of the outward flange.

Advantageous Effects of the Invention

The cylindrical case according to the present invention offers an excellent advantage in that, in the case where the cylindrical case is a fan case having an annular outward flange, high structural strength in the part of the outward flange can be secured.

BRIEF DESCRIPTION OF THE DRAWINGS

FIG. 1 is a schematic cross-sectional view illustrating an aircraft jet engine in which a fan case according to one embodiment of the present invention is adopted.

MODE FOR CARRYING OUT THE INVENTION

Figure 2A:
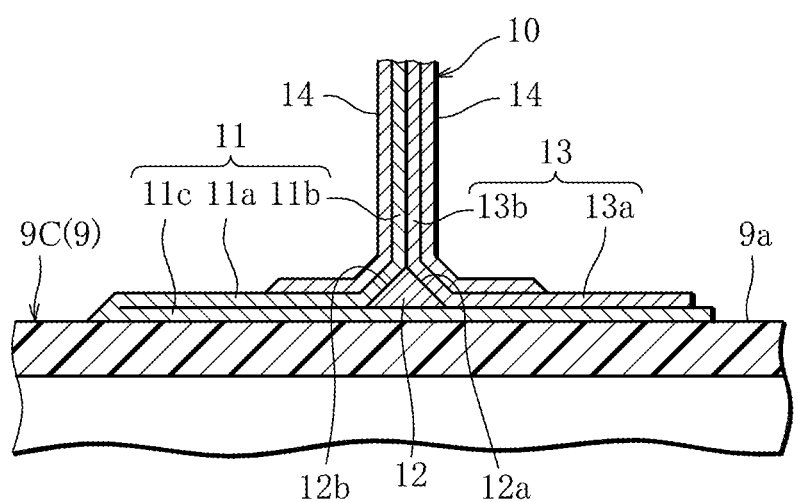
FIG. 2A is an enlarged cross-sectional view illustrating the outward flange part of the fan case of FIG. 1.

In the following, the present invention will be described on the basis of the drawings.

FIG. 1 to FIG. 4C show one embodiment of a cylindrical case according to the present invention, and in this embodiment, a case where the cylindrical case according to the present invention is a fan case of an aircraft jet engine will be taken as an example.

As shown in FIG. 1, an aircraft jet engine 1 sends air taken in from a front side (left side in the drawing) into a compressor 3 by means of a fan 2 having a plurality of fan blades, injects a fuel to the air compressed in this compressor 3 to combust them in a combustion chamber 4, and rotates a high-pressure turbine 5 and a low-pressure turbine 6 through expansion of a high-temperature gas generated by combustion.

A fan case 9 covering the plurality of fan blades of the fan 2 includes a case main body 9C which forms a cylindrical shape and an outward flange 10 which is disposed on an outer peripheral surface 9a of this case main body 9C annularly along the circumferential direction. At the front end (left end in the drawing) of the case main body 9C, an annular outward flange 9F which can be coupled with an engine cowl 7 is formed, and at the rear end (right end in the drawing), an annular outward flange 9R which can be coupled with an engine nacelle 8 is formed, and the outward flange 10 is disposed in a segmented state on the outer peripheral surface 9a of the case main body 9C.

Both the case main body 9C and the outward flange 10 of the fan case 9 are made of a composite material of reinforcing fibers such as carbon fibers impregnated with a thermosetting resin such as an epoxy resin.

In this case, as shown in FIG. 2A, the outward flange 10 includes a bonding layer 11c which is bonded on the outer peripheral surface 9a of the case main body 9C, and a foundation layer 12 having a triangular shape in cross-section and disposed on this bonding layer 11c in the circumferential direction of the case main body 9C.

The outward flange 10 further includes one flange constituting layer 13 integrally having a leg layer 13a which is laminated from one slope surface (slope surface on the right side in FIG. 2A) 12a of the foundation layer 12 to the bonding layer 11c on the side of this one slope surface 12a, and a wall layer 13b which rises from the one slope surface 12a of the foundation layer 12 in the distal direction (in the upward direction in the drawing).

The outward flange 10 further includes the other flange constituting layer 11 integrally having a leg layer 11a which continues to the bonding layer 11c and is laminated from the other slope surface (slope surface on the left side in FIG. 2A) 12b of the foundation layer 12 to the bonding layer 11c on the side of the other slope surface 12b, and a wall layer 11b which rises from the other slope surface 12b of the foundation layer 12 in the distal direction (in the upward direction in the drawing) and overlaps with the wall layer 13b of the one flange constituting layer 13.

In this embodiment, the foundation layer 12 is formed by laminating roving layers including a roving (fiber bundle) composed of a bundle of reinforcing fibers such as carbon fibers. The constituent material of the foundation layer 12 is not limited to the roving, but a material such as a cloth (fabric) or a non-crimp fabric can be used.

Figure 2B:
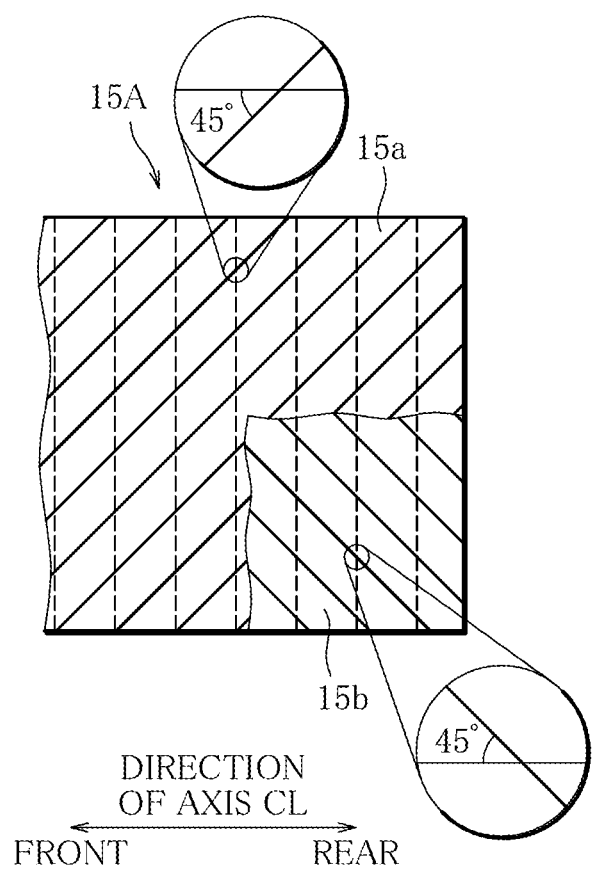
FIG. 2B is a partial planar view illustrating a biaxial fabric, which is partially cut away, adopted for an outward flange of the fan case of FIG. 1.

On the other hand, the one flange constituting layer 13 integrally having the leg layer 13a and the wall layer 13b and the other flange constituting layer 11 integrally having the bonding layer 11c, the leg layer 11a, and the wall layer 11b are both formed by laminating a plurality of biaxial fabric layers, and as shown in FIG. 2B, this biaxial fabric layer includes a biaxial fabric 15 composed of reinforcing fiber bands 15a, 15b such as carbon fibers.

This biaxial fabric 15 has a non-crimp structure composed of the two axes of reinforcing fiber bands 15a, 15b, and the orientation angle of the two axes of reinforcing fiber bands 15a, 15b to the direction of an axis CL of the case main body 9C is set to ±15-75°, and in this embodiment, as shown in the enlarged circles of FIG. 2B, the orientation angle is set to ±45°. The portions indicated by the dashed lines in FIG. 2B are stitch threads.

Here, an absolute value of the orientation angle of the two axes of reinforcing fiber bands 15a, 15b to the direction of the axis CL being smaller than 15° makes it difficult to secure strength and rigidity, and is therefore not favorable. On the other hand, an absolute value of the orientation angle of the two axes of reinforcing fiber bands 15a, 15b to the direction of the axis CL being larger than 75° may lead to occurrence of wrinkling or fiber meandering during the manufacture and is therefore not favorable, either.

The outer peripheral surface 9a of the case main body 9C and each of the wall layers 11b, 13b of both flange constituting layers 11, 13 in the outward flange 10 are all coated with a protective layer 14 (the protective layer on the outer peripheral surface 9a is not shown) made of a composite material of reinforcing fibers such as glass fibers impregnated with a thermosetting resin such as an epoxy resin. For example, this protective layer 14 serves as a cutting allowance during machining after molding of the outward flange 10, as well as serves as an electric corrosion preventive material. In addition, this protective layer 14 serves also as a protective layer when the outward flange 10 as a completed product is handled.

Figure 3A:
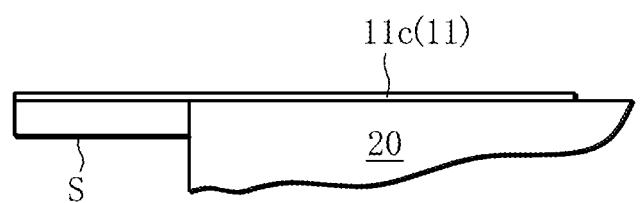
FIG. 3A is a view illustrating a first step which is a molding step of the outward flange in a manufacturing method of the fan case shown in FIG. 1.

Now, to manufacture the outward flange 10 in the manufacture of the above-described fan case 9, as shown in FIG. 3A, first, as a first step, the other flange constituting layer (11) having a sheet-like shape is laminated on a die 20 and a spacer S, which is disposed at one end of this die 20 so as to be flush with the die, to form the bonding layer 11c on the die 20.

Figure 3B:
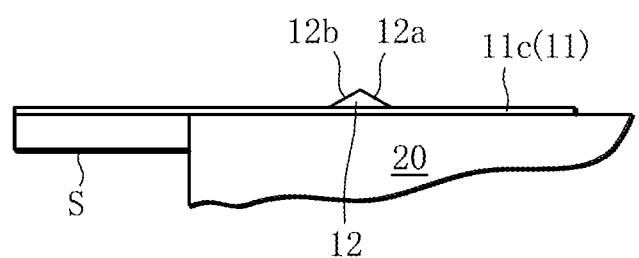
FIG. 3B is a view illustrating a second step which is a molding step of the outward flange in a manufacturing method of the fan case shown in FIG. 1.

Next, as shown in FIG. 3B, as a second step, the foundation layer 12 having a triangular shape in cross-section is formed on the bonding layer 11c which is formed on the die 20.

Figure 3C:
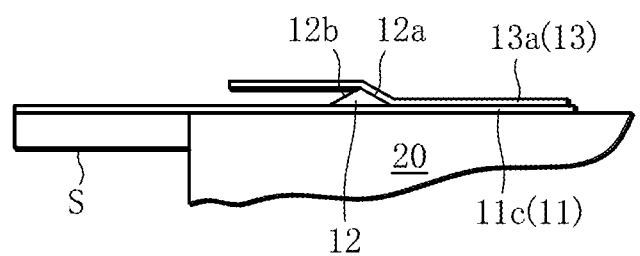
FIG. 3C is a view illustrating a third step which is a molding step of the outward flange in a manufacturing method of the fan case shown in FIG. 1.
Figure 3D:
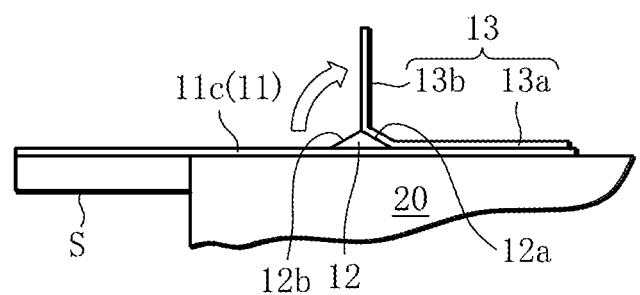
FIG. 3D is a view illustrating a fourth step which is a molding step of the outward flange in a manufacturing method of the fan case shown in FIG. 1.

Next, as shown in FIG. 3C, as a third step, a leg part of the one flange constituting layer (13) having a sheet-like shape is laminated from the one slope surface 12a of the foundation layer 12 to the bonding layer 11c located on the side of this one slope surface 12a to form the leg layer 13a, and subsequently, as shown in FIG. 3D, as a fourth step, a wall layer part of the one flange constituting layer 13 is raised on the one slope surface 12a to form the wall layer 13b.

Figure 3E:
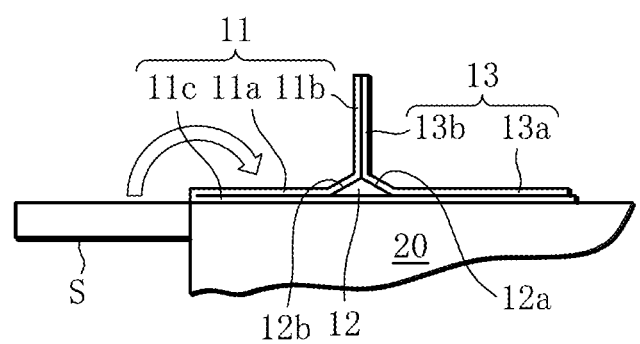
FIG. 3E is a view illustrating a fifth step which is a molding step of the outward flange in a manufacturing method of the fan case shown in FIG. 1.

Then, as shown in FIG. 3E, as a fifth step, the part of the other flange constituting layer 11, which is located on the spacer S and continues to the bonding layer 11c, is folded on the side of the other slope surface 12b of the foundation layer 12, and this folded part is laid from the bonding layer 11c over the other slope surface 12b of the foundation layer 12 to form the leg layer 11a of the other flange constituting layer 11, and at the same time the folded part is raised on the other slope surface 12b of the foundation layer 12 to form the wall layer 11b so as to overlap with the wall layer 13b of the one flange constituting layer 13.

Figure 4A:
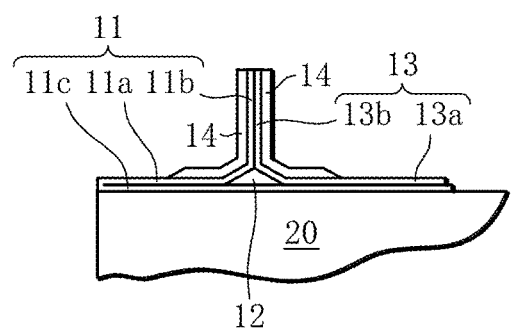
FIG. 4A is a view illustrating a sixth step which is a molding step of the outward flange in a manufacturing method of the fan case shown in FIG. 1.

Thereafter, as shown in FIG. 4A, as a sixth step, the spacer S is moved away from the die 20, and the wall layers 11b, 13b overlapping with each other of both flange constituting layers 11, 13 are coated with the protective layer 14 made of a composite material of reinforcing fibers such as glass fibers impregnated with a thermosetting resin such as an epoxy resin.

Figure 4B:
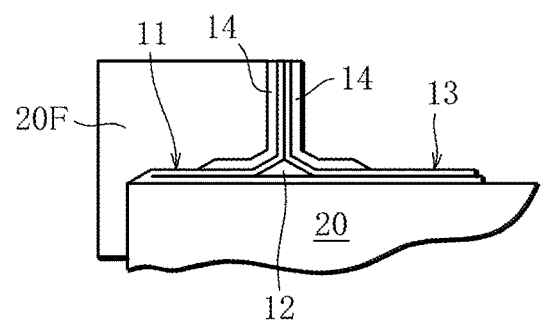
FIG. 4B is a view illustrating a seventh step which is a molding step of the outward flange in a manufacturing method of the fan case shown in FIG. 1.
Figure 4C:
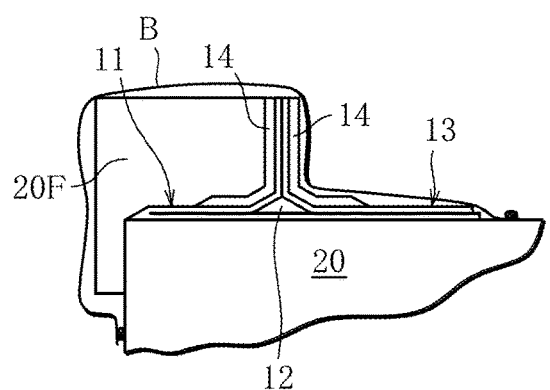
FIG. 4C is a view illustrating an eighth step which is a molding step of the outward flange in a manufacturing method of the fan case shown in FIG. 1.

Next, as shown in FIG. 4B, as a seventh step, a pressure receiving die 20F is placed on the side of the other flange constituting layer 11, and subsequently, as shown in FIG. 4C, as an eighth step, both flange constituting layers 11, 13 and the foundation layer 12 are entirely covered with a nylon film B, and these are heated and pressurized in an autoclave while the inside of the nylon film B is evacuated, to thereby cure the thermosetting resin, with which the reinforcing fibers of each of the layers 11 to 13 are impregnated, and form the outward flange 10.

Then, the outward flange 10 released from the die 20 is mounted and fixed by bonding onto the outer peripheral surface 9a of the cylindrical case main body 9C which is made of a composite material of reinforcing fibers impregnated with a thermosetting resin.

As described above, in the fan case 9 of this embodiment, since the one flange constituting layer 13 and the other flange constituting layer 11 of the outward flange 10 are both formed by laminating the plurality of biaxial fabric layers including the biaxial fabric 15 of a non-crimp structure composed of the reinforcing fiber bands 15a, 15b such as carbon fibers, as the stretchability which is characteristic of the non-crimp structure is exerted, during molding of the outward flange 10, the flange constituting layers 11, 13 are folded without developing wrinkling or fiber meandering.

In the fan case 9 of this embodiment, to manufacture the outward flange 10, the leg layer 13a of the one flange constituting layer 13 is laminated from the one slope surface 12a of the foundation layer 12 laminated on the bonding layer 11c to the bonding layer 11c located on the side of this one slope surface 12a, and the wall layer 13b of the one flange constituting layer 13 is raised on the one slope surface 12a of the foundation layer 12.

In addition, the leg layer 11a of the other flange constituting layer 11 is laminated from the other slope surface 12b of the foundation layer 12 to the bonding layer 11c located on the side of the other slope surface 12b, and the wall layer 11b of the other flange constituting layer 11 is raised on the other slope surface 12b of the foundation layer 12, so that the possibility of a clearance being left between both flange constituting layers 11, 13 and the foundation layer 12 is almost eliminated. Thus, high structural strength in the part of the outward flange 10 is secured.

The configurations of the cylindrical case and the manufacturing method of the cylindrical case according to the present invention are not limited to the above-described embodiments.

EXPLANATION OF REFERENCE SIGNS

1 Aircraft jet engine
9 Fan case
9a Outer peripheral surface of case main body
9C Case main body
10 Outward flange
11 Other flange constituting layer
11a Leg layer of other flange constituting layer
11b Wall layer of other flange constituting layer
11c Bonding layer (other flange constituting layer)
12 Foundation layer
12a One slope surface of foundation layer
12b Other slope surface of foundation layer
13 One flange constituting layer
13a Leg layer of one flange constituting layer
13b Wall layer of one flange constituting layer
14 Protective layer
15 Biaxial fabric
15a, 15b Two axes of reinforcing fiber bands
20 Die
20F Pressure receiving die
CL Axis

The invention claimed is:

1. A cylindrical case made of a composite material of reinforcing fibers impregnated with a thermosetting resin, the cylindrical case including:
a case main body which forms a cylindrical shape; and
an outward flange which is disposed on an outer peripheral surface of the case main body annularly along a circumferential direction, wherein
the outward flange includes:
a bonding layer bonded on the outer peripheral surface of the case main body;
a foundation layer having a triangular shape in cross-section and disposed on the bonding layer in the circumferential direction of the case main body;
one flange constituting layer integrally having a leg layer which is laminated from one slope surface of the foundation layer to the bonding layer on a side of the one slope surface, and a wall layer which rises from the one slope surface of the foundation layer in a distal direction; and
an other flange constituting layer integrally having a leg layer which continues to the bonding layer and is laminated from the other slope surface of the foundation layer to the bonding layer on a side of the other slope surface, and a wall layer which rises from the other slope surface of the foundation layer in the distal direction and overlaps with the wall layer of the one flange constituting layer,
the foundation layer is formed by laminating roving layers including a roving composed of a bundle of reinforcing fibers, and
the one flange constituting layer integrally having the leg layer and the wall layer and the other flange constituting layer integrally having the bonding layer, the leg layer, and the wall layer are both formed by laminating a plurality of biaxial fabric layers including a biaxial fabric of a non-crimp structure composed of two axes of reinforcing fiber bands having an orientation angle of ±15-75° to an axial direction of the case main body.

2. The cylindrical case according to claim 1, wherein the outer peripheral surface of the case main body and each of the wall layers of both flange constituting layers are all coated with a protective layer made of a composite material of reinforcing fibers impregnated with a thermosetting resin.

3. The cylindrical case according to claim 1, wherein the cylindrical case is used as a fan case for covering fan blades of an aircraft jet engine.

4. The cylindrical case according to claim 2, wherein the cylindrical case is used as a fan case for covering fan blades of an aircraft jet engine.

5. A manufacturing method of the cylindrical case according to claim 1, including:
forming the outward flange by going through the following steps:
laminating a bonding layer part of the other flange constituting layer having a sheet-like shape on a die to form the bonding layer;
forming the foundation layer having a triangular shape in cross-section on the bonding layer in the other flange constituting layer having a sheet-like shape which is laminated on the die;
laminating a leg layer part of the one flange constituting layer having a sheet-like shape from the one slope surface of the foundation layer to the bonding layer located on the side of the one slope surface in the other flange constituting layer to form the leg layer;

raising a wall layer part of the one flange constituting layer on the one slope surface of the foundation layer to form the wall layer;

folding a part of the other flange constituting layer which continues to the bonding layer on the side of the other slope surface of the foundation layer and laying the folded part from the bonding layer over the other slope surface of the foundation layer to form the leg layer of the other flange constituting layer, and at the same time raising the folded part on the other slope surface of the foundation layer to form the wall layer so as to overlap with the wall layer of the one flange constituting layer; and placing a pressure receiving die on the side of the other flange constituting layer and heating and pressurizing the laminate in a bagged state to cure the thermosetting resin with which each of the reinforcing fibers of the fabric layers are impregnated, and thereafter bonding the outward flange, which is released from the die, onto the outer peripheral surface of the cylindrical case main body which is made of a composite material of reinforcing fibers impregnated with a thermosetting resin.

6. A manufacturing method of the cylindrical case according to claim 2, including:
forming the outward flange by going through the following steps:
laminating a bonding layer part of the other flange constituting layer having a sheet-like shape on a die to form the bonding layer;
forming the foundation layer having a triangular shape in cross-section on the bonding layer in the other flange constituting layer having a sheet-like shape which is laminated on the die;
laminating a leg layer part of the one flange constituting layer having a sheet-like shape from the one slope surface of the foundation layer to the bonding layer located on the side of the one slope surface in the other flange constituting layer to form the leg layer;
raising a wall layer part of the one flange constituting layer on the one slope surface of the foundation layer to form the wall layer;
folding a part of the other flange constituting layer which continues to the bonding layer on the side of the other slope surface of the foundation layer and laying the folded part from the bonding layer over the other slope surface of the foundation layer to form the leg layer of the other flange constituting layer, and at the same time raising the folded part on the other slope surface of the foundation layer to form the wall layer so as to overlap with the wall layer of the one flange constituting layer; and
placing a pressure receiving die on the side of the other flange constituting layer and heating and pressurizing the laminate in a bagged state to cure the thermosetting resin with which each of the reinforcing fibers of the fabric layers are impregnated, and
thereafter bonding the outward flange, which is released from the die, onto the outer peripheral surface of the cylindrical case main body which is made of a composite material of reinforcing fibers impregnated with a thermosetting resin.

7. A manufacturing method of the cylindrical case according to claim 3, including:
forming the outward flange by going through the following steps:
laminating a bonding layer part of the other flange constituting layer having a sheet-like shape on a die to form the bonding layer;
forming the foundation layer having a triangular shape in cross-section on the bonding layer in the other flange constituting layer having a sheet-like shape which is laminated on the die;
laminating a leg layer part of the one flange constituting layer having a sheet-like shape from the one slope surface of the foundation layer to the bonding layer located on the side of the one slope surface in the other flange constituting layer to form the leg layer;
raising a wall layer part of the one flange constituting layer on the one slope surface of the foundation layer to form the wall layer;
folding a part of the other flange constituting layer which continues to the bonding layer on the side of the other slope surface of the foundation layer and laying the folded part from the bonding layer over the other slope surface of the foundation layer to form the leg layer of the other flange constituting layer, and at the same time raising the folded part on the other slope surface of the foundation layer to form the wall layer so as to overlap with the wall layer of the one flange constituting layer; and
placing a pressure receiving die on the side of the other flange constituting layer and heating and pressurizing the laminate in a bagged state to cure the thermosetting resin with which each of the reinforcing fibers of the fabric layers are impregnated, and
thereafter bonding the outward flange, which is released from the die, onto the outer peripheral surface of the cylindrical case main body which is made of a composite material of reinforcing fibers impregnated with a thermosetting resin.

8. A manufacturing method of the cylindrical case according to claim 4, including:
forming the outward flange by going through the following steps:
laminating a bonding layer part of the other flange constituting layer having a sheet-like shape on a die to form the bonding layer;
forming the foundation layer having a triangular shape in cross-section on the bonding layer in the other flange constituting layer having a sheet-like shape which is laminated on the die;
laminating a leg layer part of the one flange constituting layer having a sheet-like shape from the one slope surface of the foundation layer to the bonding layer located on the side of the one slope surface in the other flange constituting layer to form the leg layer;
raising a wall layer part of the one flange constituting layer on the one slope surface of the foundation layer to form the wall layer;
folding a part of the other flange constituting layer which continues to the bonding layer on the side of the other slope surface of the foundation layer and laying the folded part from the bonding layer over the other slope surface of the foundation layer to form the leg layer of the other flange constituting layer, and at the same time raising the folded part on the other slope surface of the foundation layer to form the wall layer so as to overlap with the wall layer of the one flange constituting layer; and
placing a pressure receiving die on the side of the other flange constituting layer and heating and pressurizing the laminate in a bagged state to cure the thermosetting resin with which each of the reinforcing fibers of the fabric layers are impregnated, and thereafter bonding the outward flange, which is released from the die, onto the outer peripheral surface of the cylindrical case main body which is made of a composite material of reinforcing fibers impregnated with a thermosetting resin.

* * * * *